May 1, 1956  F. F. HEISER ET AL  2,743,871
GAS FLOW CONTROL
Filed Dec. 14, 1954  12 Sheets-Sheet 1

INVENTORS
FERDINAND F. HEISER
LOURDES V. McCARTY
RENO L. VICENZI
BY John W. Michael
ATTORNEY INVENTORS
FERDINAND F. HEISER
LOURDES V. McCARTY
RENO L. VICENZI
BY
John W. Michael
ATTORNEY May 1, 1956 F. F. HEISER ET AL 2,743,871
GAS FLOW CONTROL
Filed Dec. 14, 1954 12 Sheets-Sheet 4

INVENTORS
FERDINAND F. HEISER
LOURDES V. McCARTY
RENO L. VICENZI
BY John W. Michael
ATTORNEY

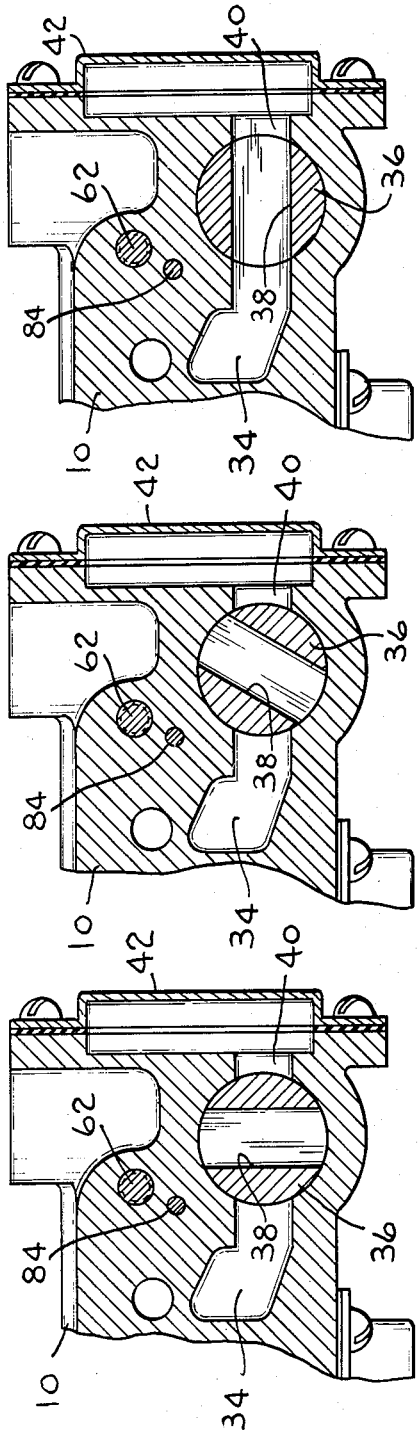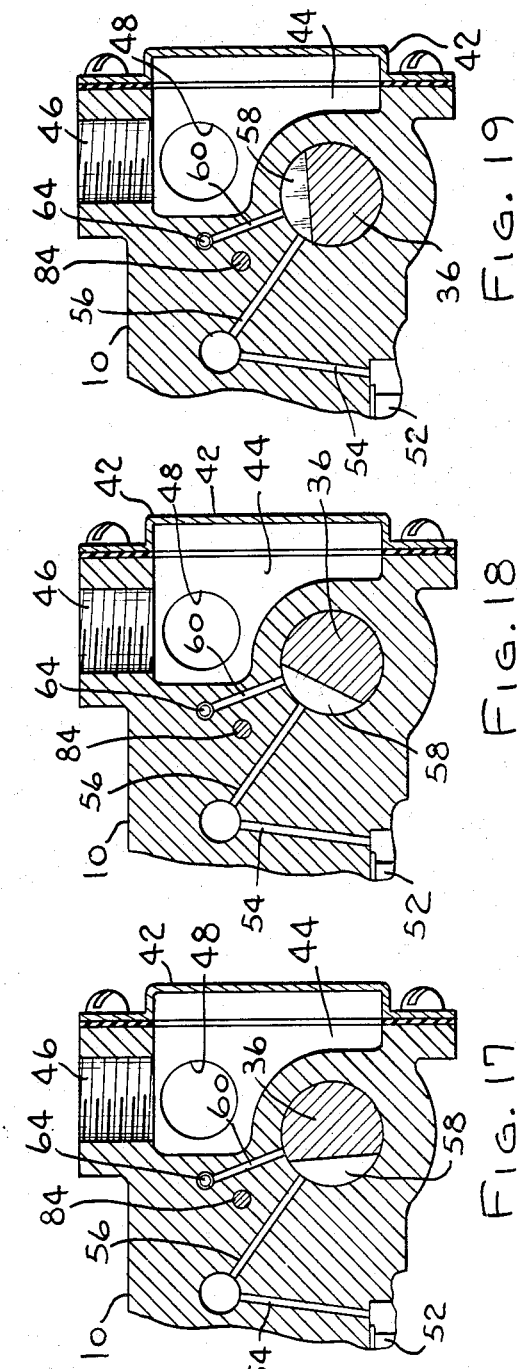

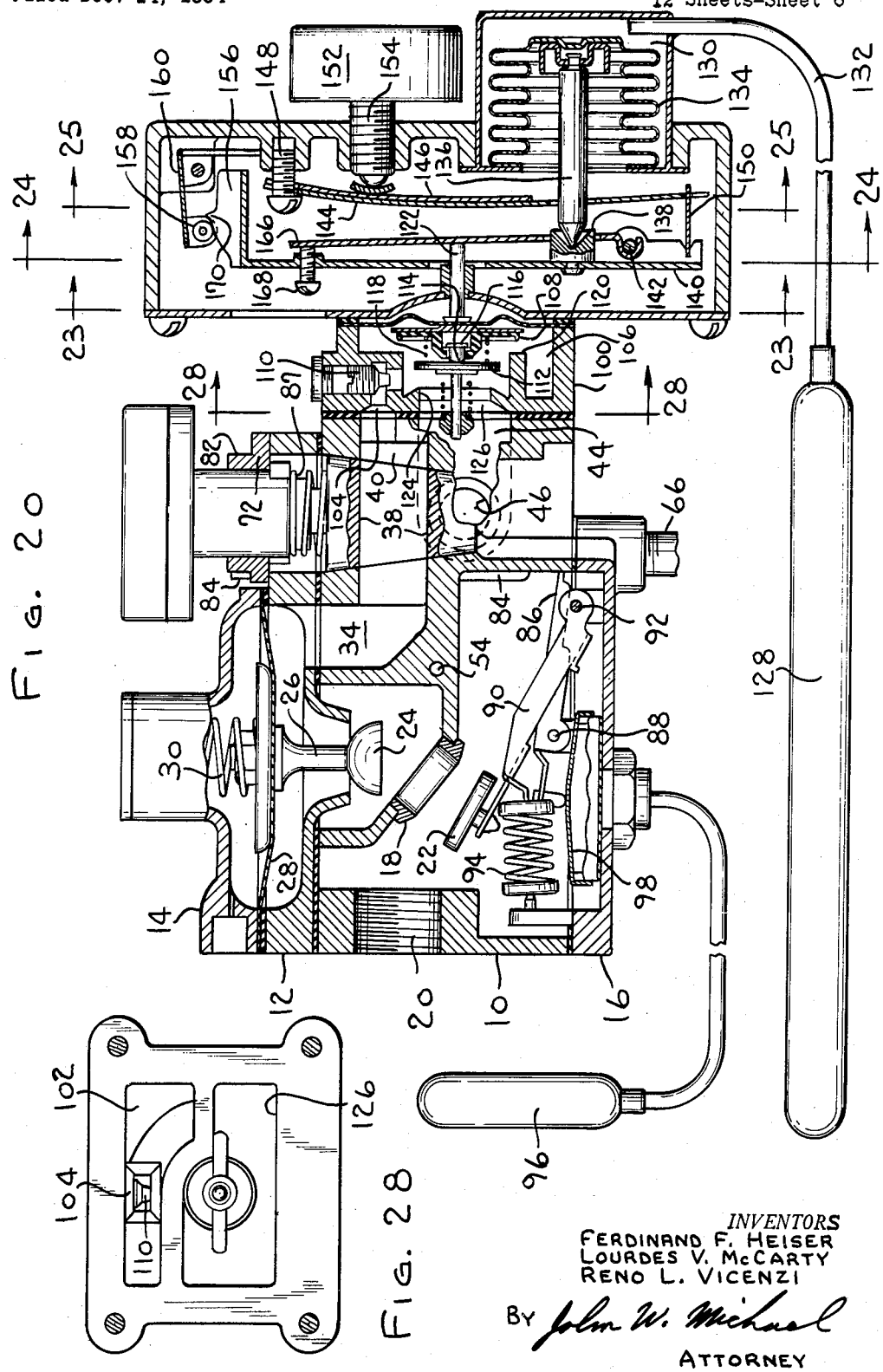

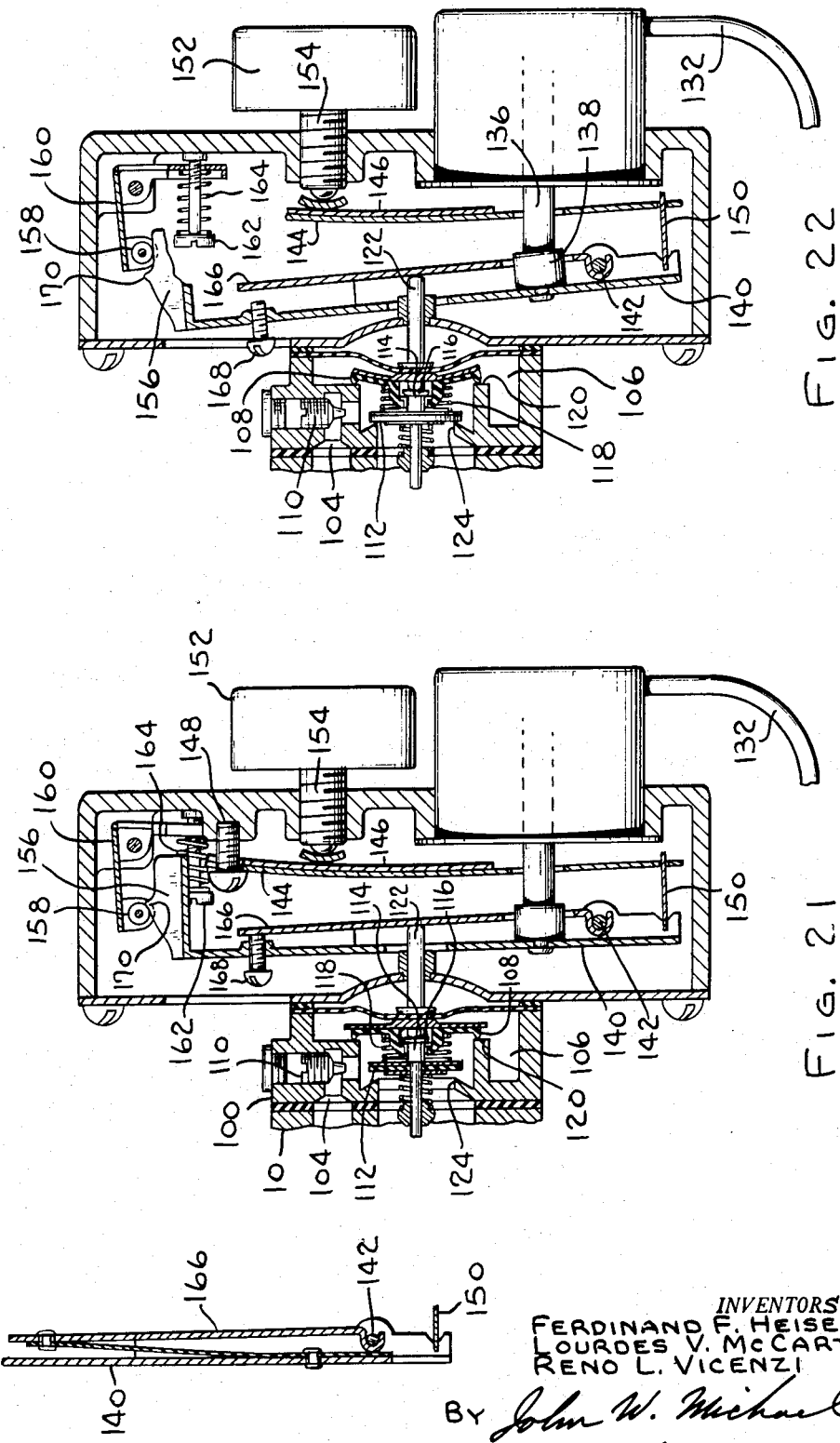

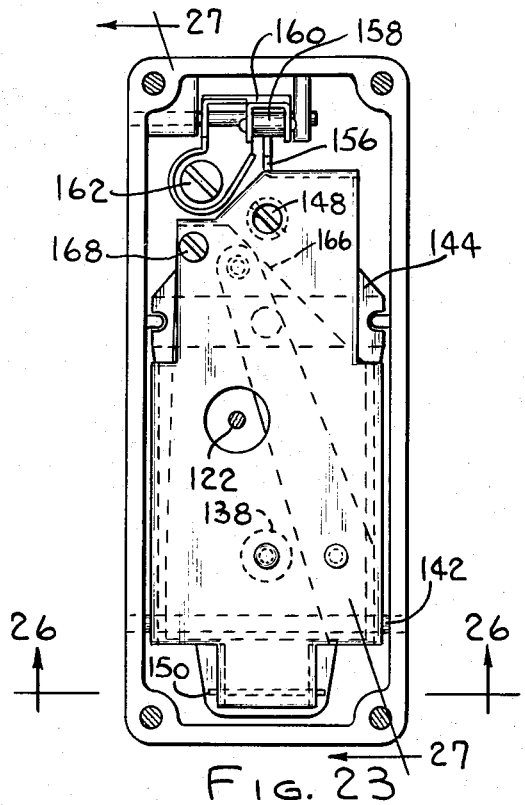
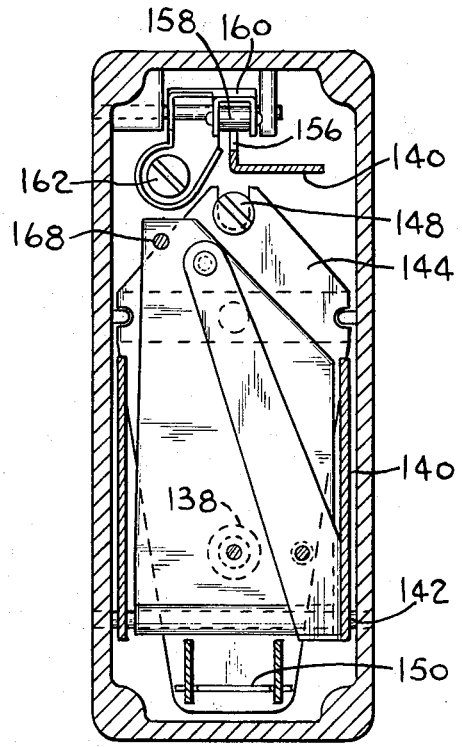
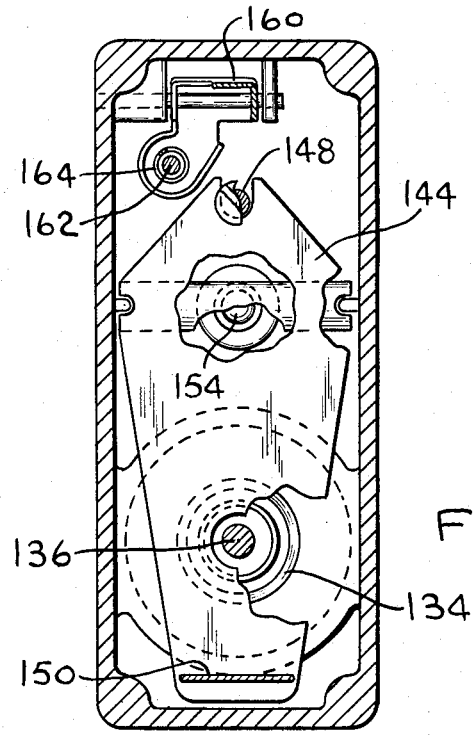
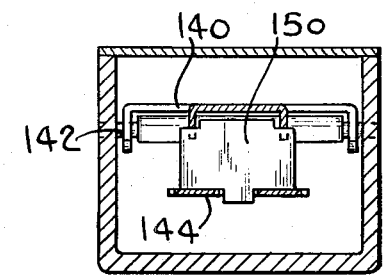

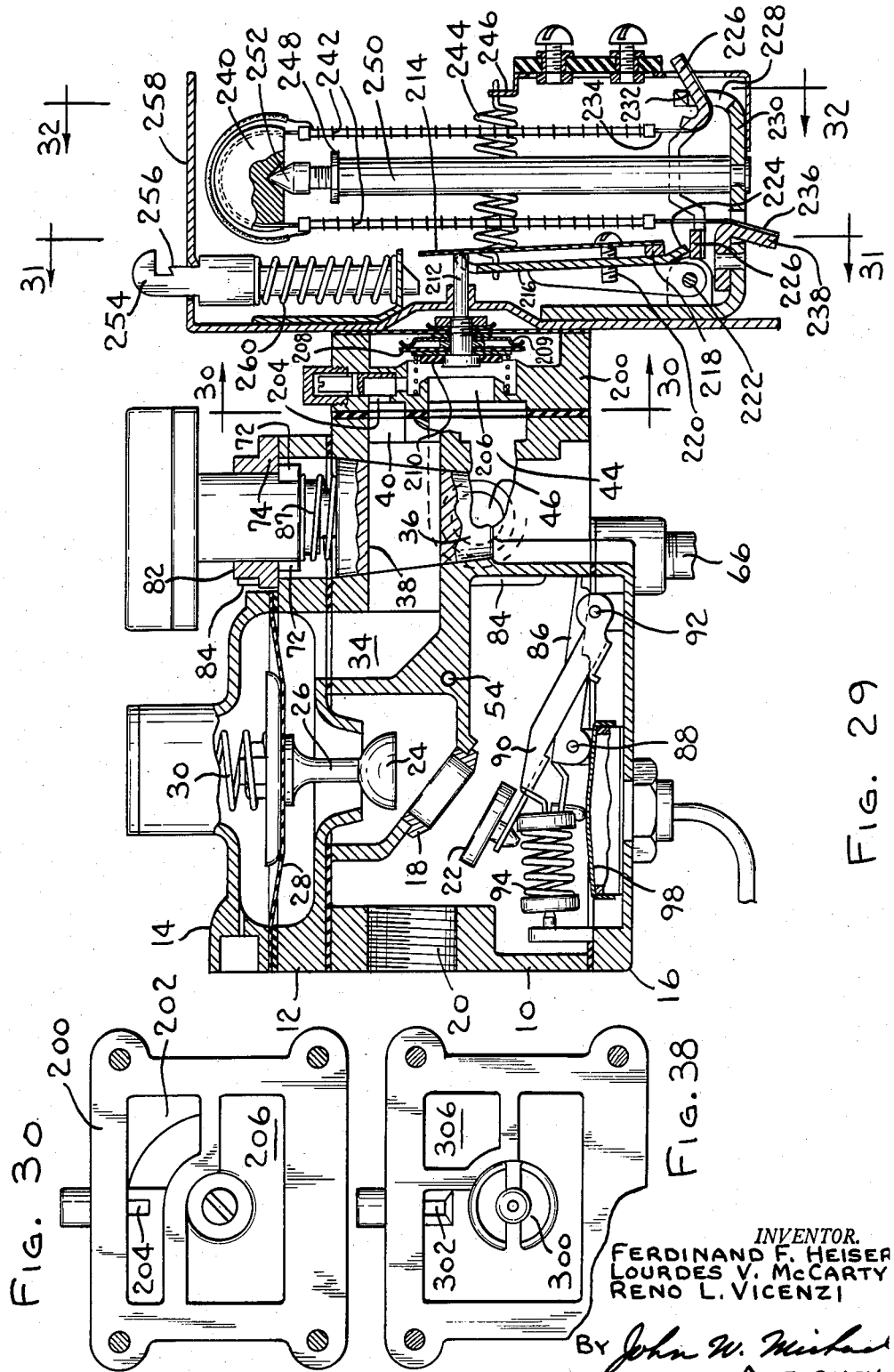

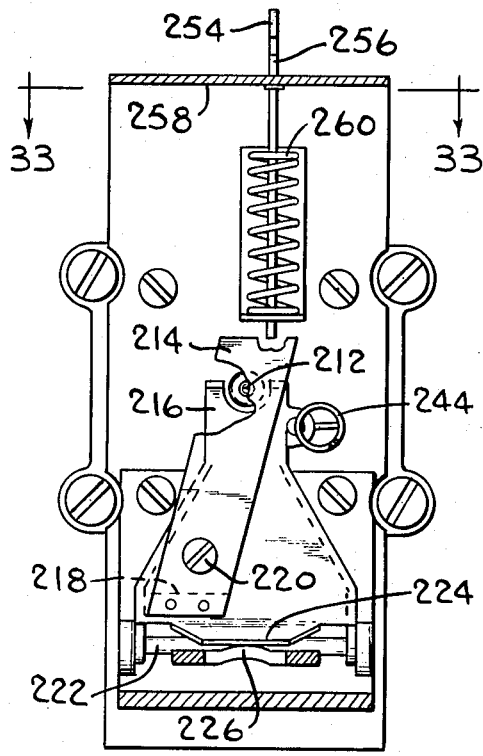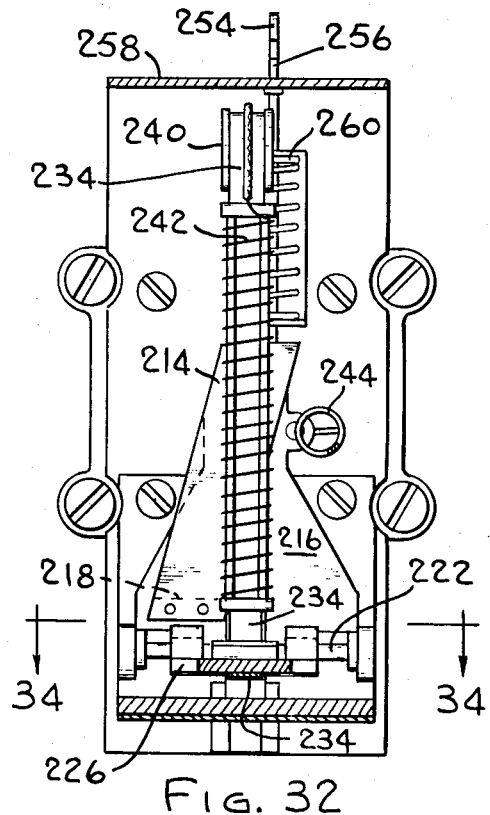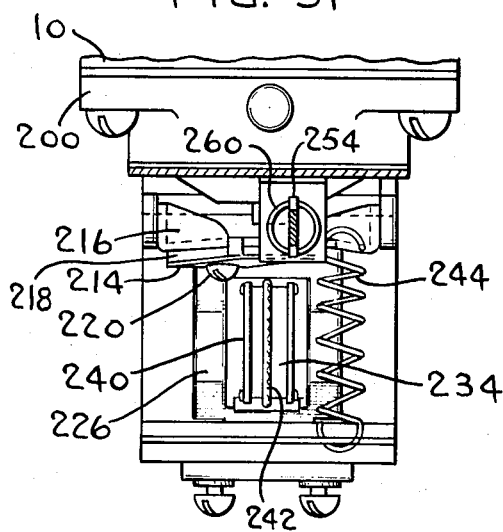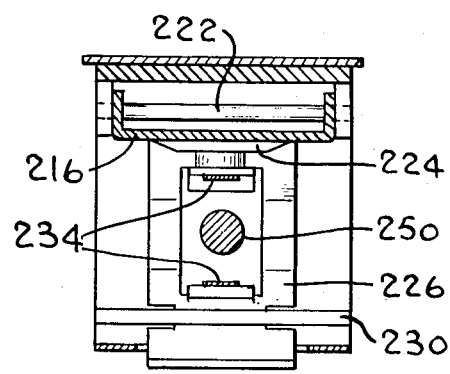

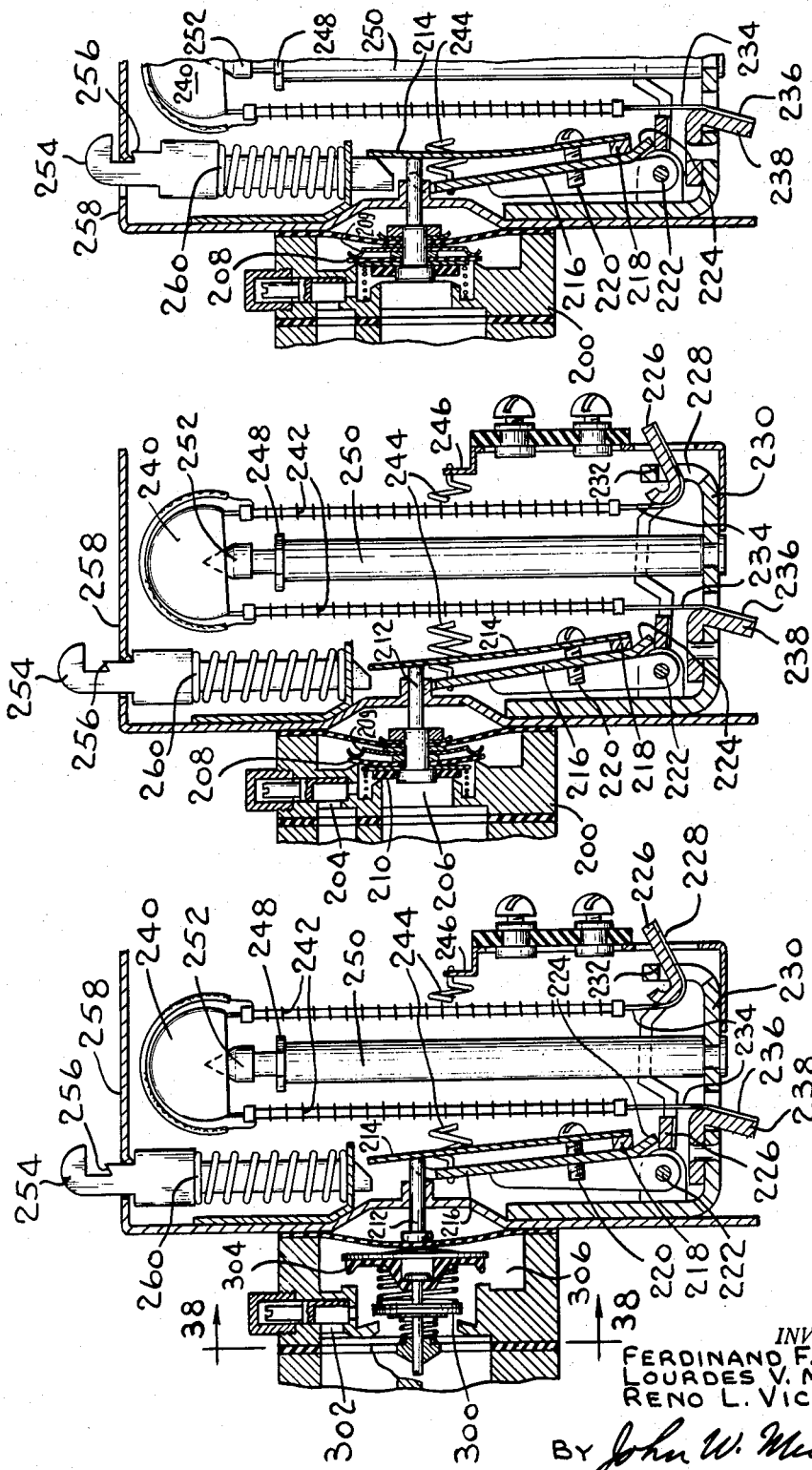

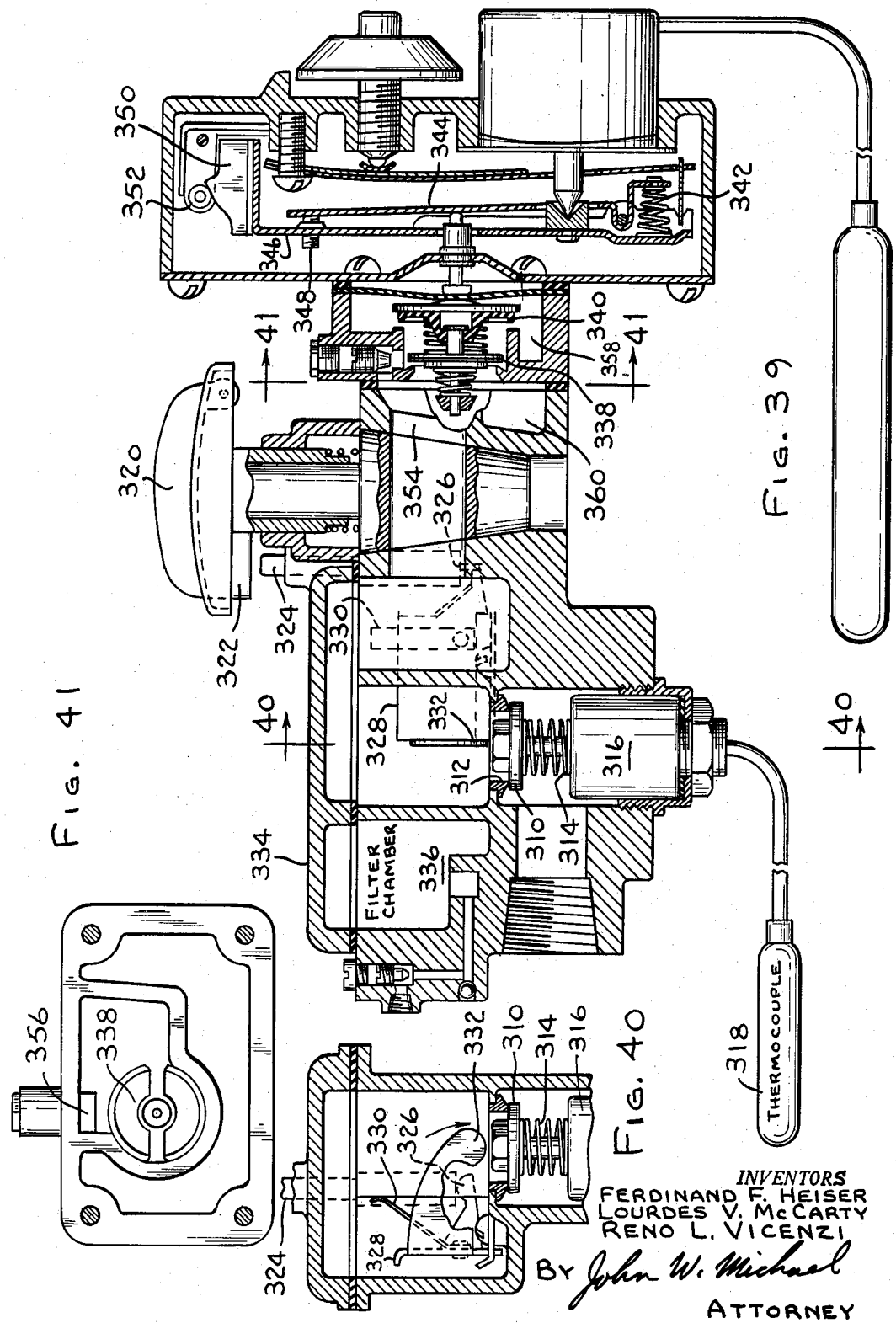

United States Patent Office 2,743,871
Patented May 1, 1956

2,743,871

GAS FLOW CONTROL

Ferdinand F. Heiser, Lourdes V. McCarty, and Reno L. Vicenzi, Milwaukee, Wis., assignors to A-P Controls Corporation, Milwaukee, Wis., a corporation of Wisconsin Application December 14, 1954, Serial No. 475,174

9 Claims. (Cl. 236—48)

This invention relates to a gas control comprising a basic unit including a safety pilot valve, a pressure regulating valve, and a manual valve. The basic unit is readily adapted to automatic mechanical or electrical thermostatic operation by addition of simple auxiliary units.

An object of this invention is to provide a simple, compact, manually controlled valve for regulating gas flow to a main and a pilot burner. The valve may include a pressure regulator for regulating pressure at the manual valve and may also include a mechanical or thermoelectric safety pilot valve.

Another object is to provide a manually controlled gas valve designed to permit easy insertion of a thermostatically controlled valve in the main burner outlet flow path.

Another object is to provide a novel valving arrangement for operation of a burner at "low fire" or "high fire" as well as "off." When this valving arrangement is used with the illustrated mechanical thermostatic operator, the flow can modulate between low and high fire.

A further object is to provide a novel knob assembly for a plug valve wherein the knob is easily installed without possible error on the part of the assembler and has novel operation features.

Still another object is to provide a basic control unit to which various additional controls may be added to provide further functions. Except in the case of the safety pilot unit these additional units carry their own valves and valve seats, thus eliminating from the cost of the basic unit cost for valve seats and the like which may not be used.

Other objects and advantages will be pointed out in, or be apparent from, the specification and claims, as will obvious modifications of the single embodiment shown in the drawings in which:

Fig. 2 is a vertical section of the valve shown in Fig. 1 and is taken on section line 2—2 in Fig. 1. In this figure the manually operated valve is in the "off" position.

Fig. 14 is a fragmentary section taken as indicated by line 14—14 in Fig. 2 to show the plug valve in its "off" position;

Fig. 15 is a fragmentary section taken on line 15—15 in Fig. 3 to show the plug valve in the pilot position;

Fig. 16 is a fragmentary section taken on line 16—16 in Fig. 4 to illustrate the plug valve in the full "on" position;

Fig. 17 is a fragmentary view taken on line 17—17 in Fig. 2 to illustrate the position of the plug valve in the "off" position in so far as it regulates the pilot flow;

Fig. 18 is a view similar to Fig. 17 with the plug valve in the pilot position with the section being taken on line 18—18 in Fig. 3;

Fig. 19 is similar to the two preceding figures and is taken on line 19—19 in Fig. 4 to show the plug valve positioned in the full "on" position;

Fig. 20 is a vertical section through a modification in which a mechanical thermostat unit has been added to the basic unit illustrated in Figs. 1 through 19. Further views relating to this same modification are Figs. 21 through 28.

Fig. 21 is a fragmentary view similar to the right-hand portion of Fig. 20, but shows the valve in the low fire position rather than in the full "on" position illustrated in Fig. 20;

Fig. 22 is similar to Fig. 21, but shows the valve in the full "off" position;

Fig. 23 is a section taken on line 23—23 in Fig. 20 to illustrate the arrangement of the various levers employed in this modification;

Fig. 24 is a section taken on line 24—24 in Fig. 20 to further illustrate the leverage;

Fig. 25 is a section taken on line 25—25 in Fig. 20 to additionally illustrate the leverage;

Fig. 26 is a section taken as indicated by line 26—26 in Fig. 23;

Fig. 27 is a fragmentary section taken on line 27—27 to show the leaf spring assembly which permits overtravel of the thermostatic unit without damaging the valve or the thermostat;

Fig. 28 is a section taken as indicated by line 28—28 in Fig. 20 and shows further details of the port arrangement for controlling the outlet flow to the main burner after the gas leaves the manual valve;

Fig. 29 is the first of a number of figures (Figs. 29 through 37) illustrating an electrical thermostatic unit mounted on the basic valve. In Fig. 29 the valve is shown in the full "on" position;

Fig. 30 is a sectional view taken as indicated by line 30—30 on Fig. 29;

Fig. 31 is a sectional view taken as indicated by line 31—31 on Fig. 29;

Fig. 32 is a sectional view taken as indicated by line 32—32 on Fig. 29;

Fig. 33 is a sectional view taken as indicated by line 33—33 on Fig. 31;

Fig. 34 is a sectional view taken as indicated by line 34—34 on Fig. 32;

Fig. 35 is a fragmentary sectional view similar to Fig. 29, but shows a different valve arrangement;

Fig. 36 shows the valve of Fig. 29 in the "off" position and both of the series valves closed;

Fig. 37 is a view similar to Figs. 35 and 36, but shows the latch moved into the path of the leaf spring valve operator to prevent the control from going to the full "off" position so that the resultant operation will be between "on" and "low fire";

Fig. 38 is a view similar to Fig. 30, but shows the modified porting arrangement required by the modification shown in Fig. 35;

Fig. 39 is a section of a modified construction employing a thermocouple safety pilot and a modified mechanical thermostat arrangement;

Fig. 40 is a view on line 40—40 in Fig. 39 to show another reset mechanism; and

Fig. 41 is a view showing the port arrangement employed in this modification.

Figure 1:
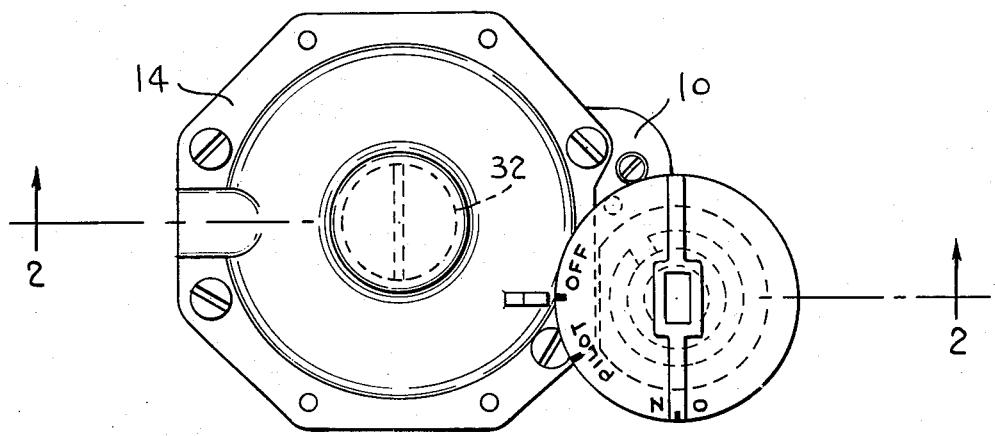
Fig. 1 is a top plan view of the basic manual control valve.

Referring now to the drawings in detail, the basic unit is shown in Figs. 1 through 19. This unit incorporates a safety pilot valve, a pressure regulating valve and a manually operable valve for directing flow to the pilot burner or to the pilot and main burner and also for cutting off flow to both burners. This basic unit is extremely versatile in design since it permits addition of either electrical or mechanical thermostatic units for regulating the flow to the main burner and also permits use of the thermo-pressure type safety pilot shown in Figs. 1 through 19 or the use of a thermocouple type safety pilot as shown in Figs. 39 and 40.

The main unit comprises a body casting 10 upon which the bottom and top castings 12, 14 of the pressure regulator housing are mounted with the use of suitable gaskets to prevent leakage. Plate 16, on which the safety pilot valve mechanism is preassembled, is mounted on the bottom of the body casting to properly locate the safety valve with respect to its seat 18. Gas enters inlet 20 and flows past safety valve 22 (assuming it to be open) and pressure regulating valve 24 carried on stem 26 depending from diaphragm 28 biased downwardly against the gas pressure by compressed spring 30. The compression of spring 30 is adjusted to give the proper pressure on the outlet side of the pressure regulating valve 24 by turning threaded cap 32. The main flow at the regulated pressure then flows through conduit 34 in the body 10 to the inlet of the plug valve 36. Assuming the hole 38 through the plug valve is lined up with the inlet and the outlet, flow will go through the plug valve to the outlet 40 and, in the case of the basic unit, this flow leaves the body to travel under cap 42 into the main outlet chamber 44. This outlet chamber 44 is provided with optional outlets 46, 48 at right angles to each other to facilitate installation of the unit in most any environment. As shown in the drawing, the outlet 46 is used while outlet 48 is plugged.

Figure 5:
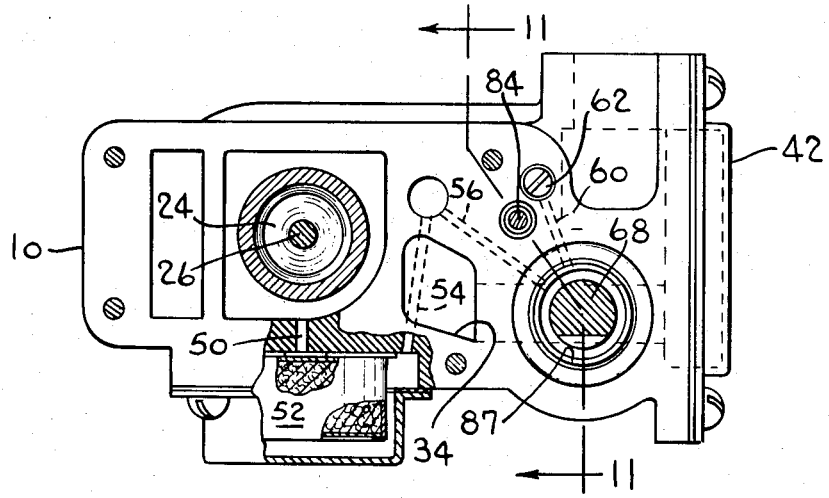
Fig. 5 is a horizontal section taken on line 5—5 in Fig. 2 and shows the pilot flow path from the space between the safety valve and the pressure regulator valve through the gas filter, past the manually regulated valve and out through the metering needle.
Figure 6:
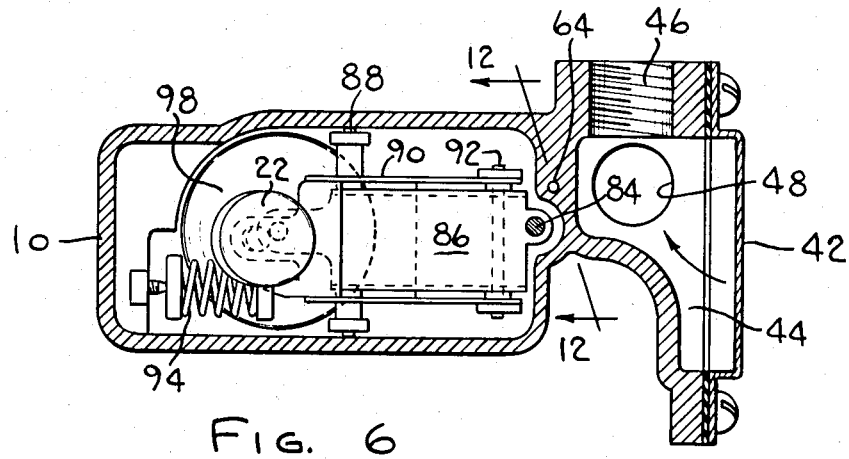
Fig. 6 is a horizontal section taken as shown by line 6—6 in Fig. 3 and shows the lever arrangement for the safety valve as well as showing the outlet flow path to the main burner outlet.
Figure 7:
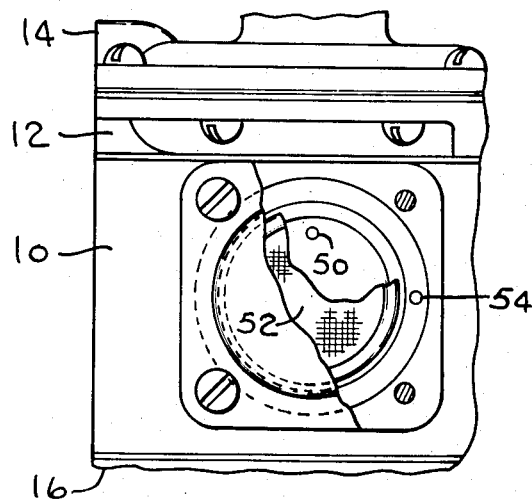
Fig. 7 is a side elevation of Fig. 5 showing the placement of the filter assembly and the locations of the inlet to and outlet from the filter.
Figure 8:
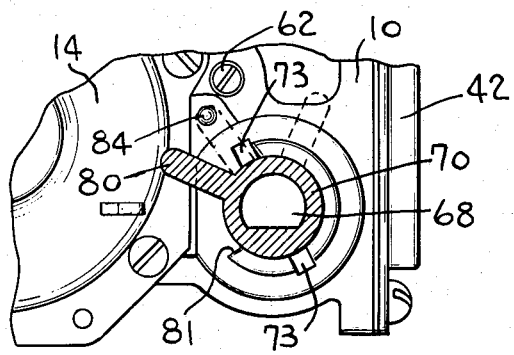
Fig. 8 is a horizontal section through the knob as indicated by line 8—8 on Fig. 2 and shows the land on the underside of the knob which may register with the reset pin in the pilot position to move the safety valve from its seat.
Figure 11:
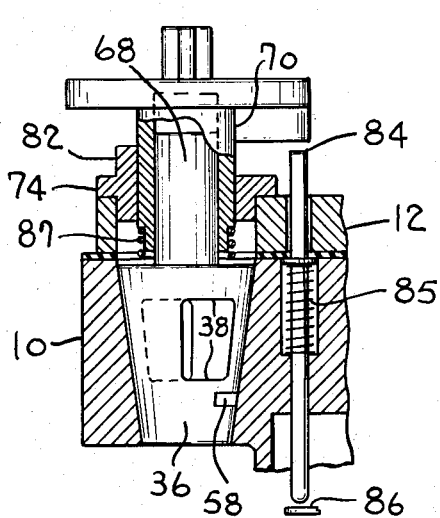
Fig. 11 is a section taken on broken line 11—11 in Fig. 5 to illustrate the manner in which the land on the underside of the knob registers with the reset pin in the pilot position.
Figure 9:
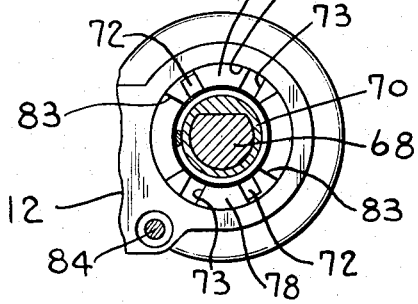
Fig. 9 is a horizontal section taken as indicated by line 9—9 on Fig. 10 and shows the manner of assembling the knob structure to the shaft of the manual valve.
Figure 10:
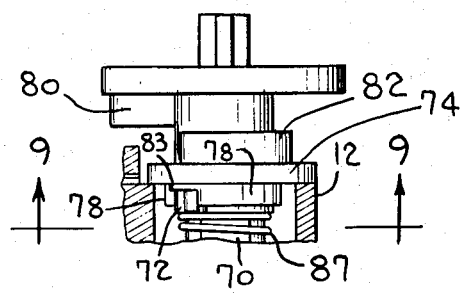
Fig. 10 is a fragmentary view of the valve in the full "on" position.
Figure 12:
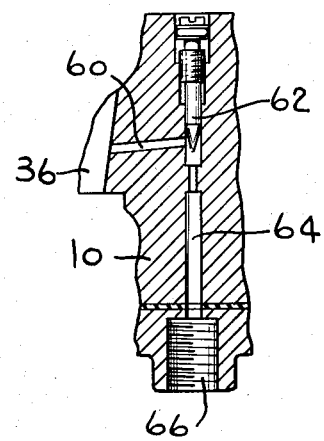
Fig. 12 is a section taken on line 12—12 of Fig. 6 to show the metering stem in the outlet flow path of the pilot burner flow.
Figure 13:
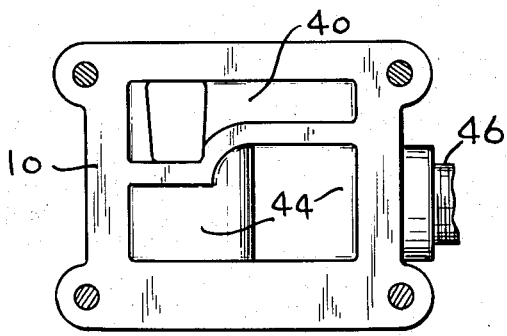
Fig. 13 is a section taken on line 13—13 in Fig. 4 to illustrate the appearance of the end of the basic unit with the cap removed to show the flow path from the manual valve to the outlet.

As noted above, the main flow goes past the pressure regulator valve and then through the plug valve. The pilot flow, on the other hand, does not flow past the pressure regulator valve. Referring particularly to Figs. 5 and 12, the body is provided with a bore 50 which permits the pilot gas flow to flow from the space between the safety valve and the pressure regulating valve laterally through the filter 52 and thence through bores 54 and 56 to the plug valve. The plug valve is provided with a cut 58 which, when properly positioned, allows the pilot flow from conduit 56 to go into conduit 60. Flow through conduit 60 is then metered by pin 62 and flows into conduit 64 which communicates with the tapped hole 66 to which the pilot burner is connected.

The plug valve has a D-shaft 68 which is received in the D-shaped interior of hollow knob sleeve 70 to couple the two shafts together while permitting the knob to slide axially on the valve shaft. Sleeve 70 is provided with diametrically opposed lugs 72 which pass through cooperating slots 73 in plate 74 when the knob is assembled to the plug valve. When the knob is pushed down in this manner, the finger 80 under the knob slides into slot 81 in the arcuate collar 82. After the lugs 72 are passed through holes 73, the knob is turned clockwise (as viewed in Fig. 9) to rotate the lugs to fall into the arcuate cut-out portions 76, 76 on the underside of the plate 74. Since finger 80 strikes the end of slot 81, if the knob is rotated in the wrong direction, the assembly of the knob to the shaft cannot be improperly executed. This is an important feature since assembly costs are thus held to a minimum. The ends of the arcuate cuts 76 determine the limits of the knob movement. Thus, the engagement of the lugs with the ends of the arcuate cut-outs determines the full "on" and the "off" positions of the knob. When the knob assembly is mounted on the control, the knob cannot be pushed down far enough to move the lugs under the depending portions 78 to disengage the knob from the plate. Such extreme movement is prevented, in this embodiment, by contact of finger 80 with the pressure regulator casting 14 or with collar 82. Another way to prevent this extreme movement is to limit the downward movement to less than that required to pass the lugs under parts 78 as in the modification shown in Fig. 39 where the sleeve contacts the top of the plug valve to limit movement. The cut-out 81 in collar 82 allows downward movement of the knob only between "off" and "pilot" positions when the control is assembled (and additionally between "off" and the disassembly point where the slots 73 and lugs 72 are aligned when the knob and plate are removed from the main control).

The arcuate cut-out 76 is here shown with a step 83 at the pilot position—that is, the depth of the cut-out from "off" to "pilot" is less than from "pilot" to "on." With this construction, rotation of the knob from "off" to "on" is unimpeded, but when the knob is rotated back towards "off," spring 87 holds lugs 72 against the cut-out so it engages the step 83 at the pilot position to stop closing movement of the knob unless the knob is slightly depressed to clear the lugs 72 of the step. This feature prevents inadvertent shut-down when it is desired only to turn the control to "pilot."

The above construction permits the knob handle to move up and down in the pilot position to register the finger 80 with the reset pin 84 for actuation. The construction is foolproof from the assembly standpoint since it is impossible to improperly assemble the knob to the valve. Even though the parts go together readily during the course of assembly, when the unit is completed, the knob cannot be removed accidentally, and, in fact, can only be removed by removal of plate 44 from the control.

Figure 3:
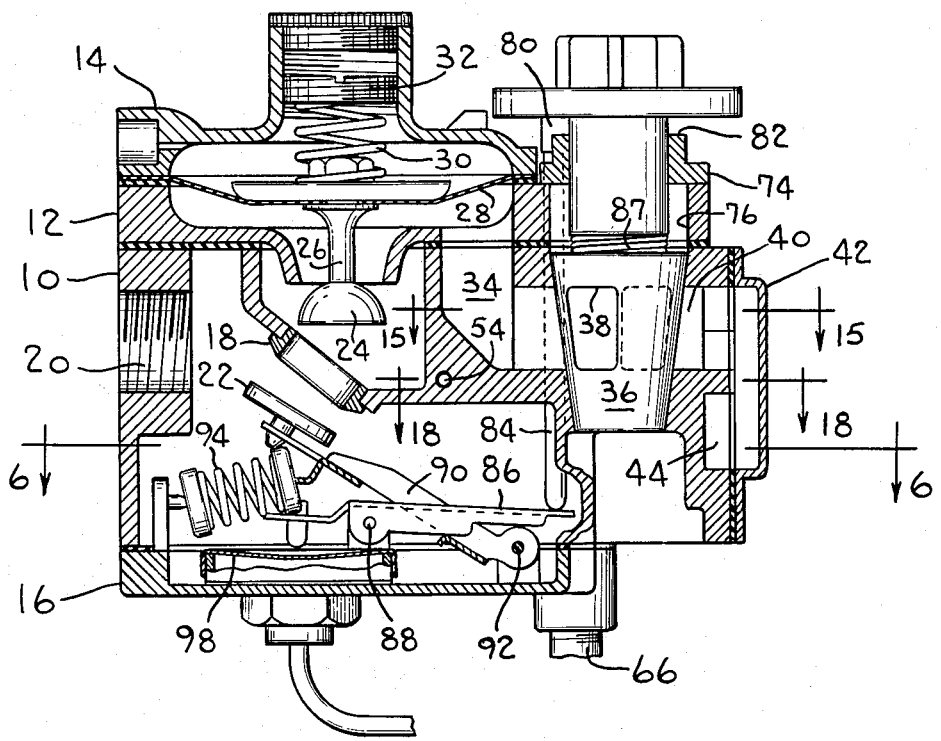
Fig. 3 is a view similar to Fig. 2, but shows the manual valve rotated to the pilot position and the knob depressed to open the safety valve against the bias of the spring tending to close the safety valve.
Figure 4:
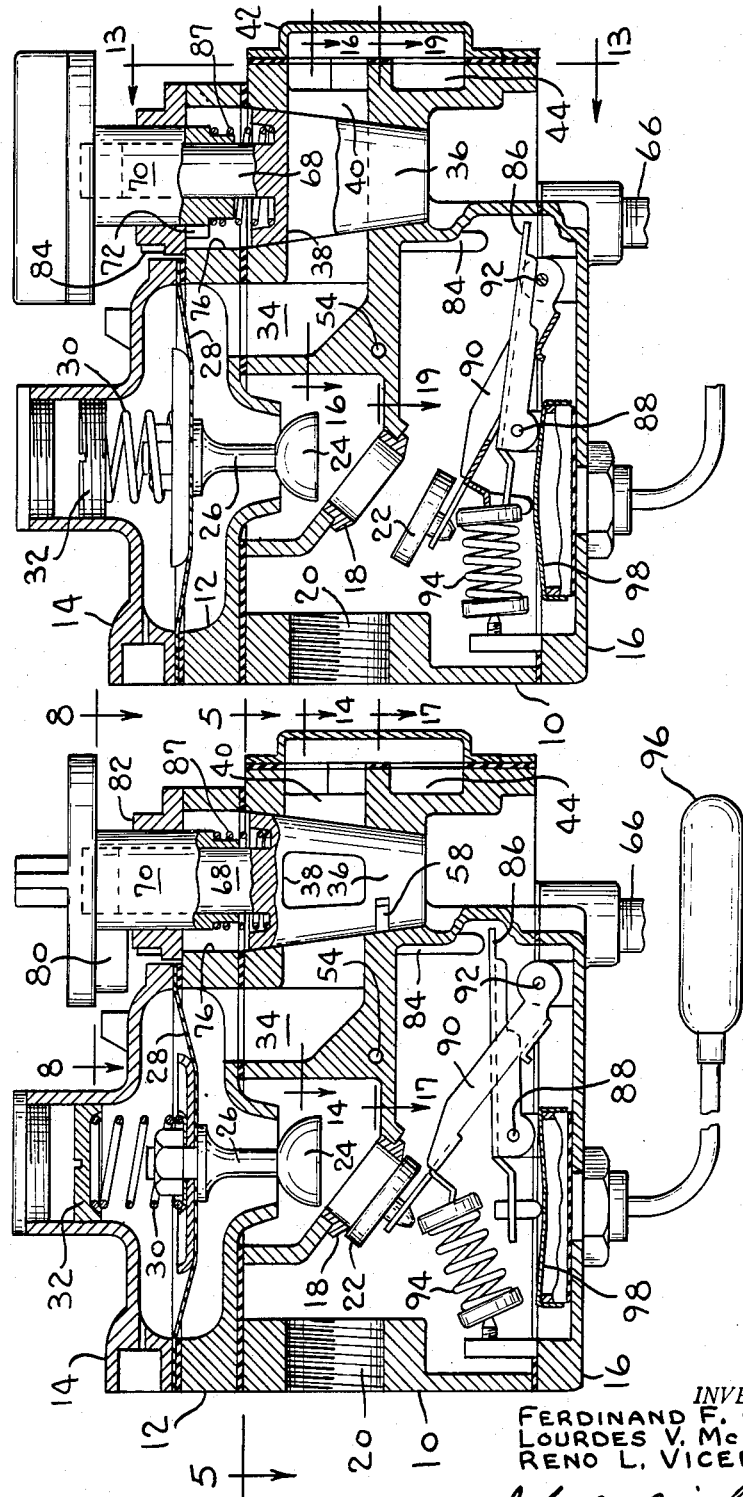
Fig. 4 is a view similar to Figs. 2 and 3, but shows the manual valve rotated to the full "on" position and the safety valve held open by the action of the diaphragm.

As noted above, the knob can be moved downwardly in the pilot position to register finger 80 with the reset pin 84 and move the pin downwardly. This moves the pin downwardly against the bias of spring 85 to act on the end of lever 86 pivoted at 88 on the safety pilot assembly. The down position of the reset pin is illustrated in Fig. 3 which also shows the manner in which the lever 86 acts to move lever 90 counter-clockwise about its pivot 92 against the bias of spring 94 to move the safety valve 22 off seat 18. If the pilot burner is now lit, the flame will heat bulb 96 positioned in the pilot flame to flex the diaphragm 98 upwardly and hold lever 86 in its clockwise position and the safety valve open, thereby permitting the knob to be released for return movement under the influence of spring 87. Should the pilot burner be extinguished, bulb 96 cools and diaphragm 98 will collapse whereupon spring 94 moves safety valve 22 to seat 18 to cut off flow to both burners.

From the above, it will be apparent that the basic unit incorporates a safety pilot valve, a pressure regulator valve and a manual valve which may be manipulated to direct flow to the pilot burner alone or to both burners. It will be noted that the flow to the main burner, on leaving the plug valve, flows out of the valve body and returns to the body for flow through either of the two available outlet ports. The flow is directed out of the body and back into the body in order to permit simple adaptation of the basic unit to automatic operation. Thus, the add-on units which convert the basic unit to automatic operation are designed to receive the flow from the outlet 40 and regulate that flow prior to returning it to the outlet 44.

In the modification shown in Figs. 20 through 28 the mechanical thermostatic add-on unit includes an intermediate casting 100 having an inlet 102 and a by-pass inlet 104, both of which line up with the outlet 40 from the main casting. The main inlet 102 communicates with the space 106 around and to the rear of the large valve 108 while the by-pass opening 104 goes past the adjustable metering valve 110 and communicates with the space between the large valve 108 and the smaller valve 112. It will be noted that the valves 108, 112 are mounted in series and that the smaller valve stem 114 is provided with a head 116 and is urged away from the larger valve by spring 118 to allow relative movement of the valves with respect to each other after the larger valve 108 is moved to its seat 120. The main stem 122 is actuated so as to seat the larger valve 108 first and thus cut off the main flow from the plug valve, while allowing low rate of flow through the by-pass 104. Continued movement of valve stem 122 allowed by flexure of valve 108 (see Fig. 22) will seat the smaller valve 112 on its seat 124 to cut off all flow through the intermediate casting, and therefore, cut off all flow to the main burner. The rate of flow when only the by-pass flow occurs, is the lowest flow rate which will sustain a flame at the main burner and thus is the lowest fire condition obtainable at the main burner. If the smaller valve 112 is closed to shut off this flow, the only gas flow to the heater unit is the flow to the pilot burner. It will be appreciated, of course, that the outlet 126 from the intermediate casting communicates with the outlet chamber 44 in the main body.

The two series valves are operated in accordance with temperature changes at a remote location as sensed by the feeler bulb 128 which is connected to bellows chamber 130 by means of capillary tube 132. When the pressure in the bulb and chamber 130 increases due to a rise in ambient temperature at bulb 128, bellows 134 tends to collapse which moves the pin 136 down onto pad 138 carried by lever 140. This will pivot lever 140 about its pivot point 142. The pivotal movement of the lever is opposed by leaf springs 144, 146 which are anchored at one end by screw 148 which may be adjusted to adjust the force exerted thereby. The free end of spring 144 acts on link 150 to exert a force on lever 140 on the side of pivot 142 opposite the point at which the bellows pin 136 exerts its force. It is to be noted that knob 152 may be rotated on its threaded shaft 154 to adjust springs 144, 146 to vary the spring force and to thereby vary the temperature maintained by the unit.

The upper end of lever 140 carries a cam 156 against which a roller 158 mounted on pivoted crank 160 acts. The force of the roller acting on the cam may be adjusted by turning screw 162 which adjusts the force of spring 164. The actual operating lever 166 is also mounted on pivot 142 and is urged toward lever 140 by means of leaf spring 168 connected to both of the levers (140 and 166). Screw 168 carried in lever 140 may be turned to adjust the position of lever 166 with respect to lever 140 and thereby adjust the unit so that the larger valve 108 will be seated when roller 158 reaches the peak 170 on cam 156. As viewed in Figs. 20, 21 and 22, the portion of the cam to the left of peak 170 represents the range between the aforementioned low fire and high fire, while the portion of the cam to the right of the peak represents the pilot fire condition. The cam is so shaped as to resist further movement of lever 140 in a counterclockwise direction about the lever pivot until the bellows system builds up sufficient force to drive the cam under the roller. Since this requires considerable force to drive over the peak or tip on the cam, the lever 140 will snap from the low position to the full "off" position seating the smaller valve 112. This is further insured by the slope of the cam immediately to the right of the peak which forces the cam to continue its movement due to the action of the roller pressing on the cam under the influence of the spring 164.

As noted above, the screw 168 is adjusted so that the main valve 108 is seated when the roller reaches the peak of cam 156. When the bellows continues to exert a force in a closing direction on lever 140, the unit will snap to the full "off" position seating valve 112. Any overtravel of the lever mechanism will merely move lever 166 off stop screw 168 against the bias of the leaf spring 166. When the feeler bulb cools, it will be noted that the system must develop considerable force before the cam can move under the roller and drive past the peak 170. Since this requires considerable force and since the slope of the cam to the left of the peak is considerable, the mechanism will snap from "off" to a flow position corresponding to a higher flow rate than that obtaining when the roller is at peak 170. The mechanism will generally snap to full "on" position. This insures sufficient fuel flow to the main burner to start ignition. A higher flow rate is necessary to initiate combustion at the main burner than is necessary to maintain a minimal fire.

It will be seen that the present control permits modulating the fire at the main burner between a high and a low flow rate, and then snapping to full shutoff position when called for by the ambient temperature at bulb 128. When the flow is re-established, the flow rate will be greater than that corresponding to the low fire rate, and thus, will insure good starting flow. With this type of operation a lower fire can be had in the modulating operation than can be had in the usual modulating control wherein the low fire position corresponds to the ignition flow rate.

The above control can take other forms as will be apparent hereinafter. Therefore, the present invention is not to be limited to the construction just described.

The modification just described is basically adapted to space heating installations wherein the feeler bulb can be located fairly near the heater. When it is desired to go into the usual electrical thermostatic operation, the add-on unit can take a different form such as in Figs. 29 to 34, 36 and 37.

The intermediate casting 200 on the electrical unit is essentially the same as that on the mechanical unit, having an inlet port 202 and an auxiliary inlet 204 which line up with the outlet 40 on the main casting. The outlet 206 from the intermediate casting lines up with the outlet chamber 44 on the main casting. Similarly, the unit employs series valves 208, 210 with the low fire by-pass conduit 204 communicating with the space between the series valves. It will be noted that the construction of the series valves in this case is slightly different from that found in the mechanical modification and it is shown in this way to illustrate the manner in which the construction can be varied.

It will be noted that valve 208 is backed by a flexible spring clip 209. In Fig. 29 the clip is unstressed since both valves are open. In Fig. 37 the clip 209 is unstressed, or only slightly stressed, since only valve 208 is seated while Fig. 36 shows the manner in which the clip 209 and valve 208 flex when the stem 212 is moved further to the left to seat the smaller valve 210. The edges of the clip are curled as shown to avoid cutting into the neoprene valve 208.

The main valve stem 212 is actuated by leaf spring 214 fixed on lever 216 at 218 and adjustable with respect thereto by turning screw 220. The lever 216 is pivoted on pin 222 and has an ear 224 which bears on the free end of lever 226. This lever projects through an opening 228 in plate 230 and can rock or pivot on point 232. A stainless steel strip 234 is anchored at 236 on the stationary bracket 238 and extends upwardly over the grooved semi-cylindrical member 240 and back down to anchor on lever 226. Heater wire 242 is wrapped around each vertical stretch of the steel strip 234 and is insulated therefrom by wrapping the wire around the insulated edges of the strip. These insulated edges can be conveniently provided by splitting a length of spaghetti tubing or sleeving and slipping it onto the edge of the steel strip. The heater wire is connected in the thermostat circuit so that when the thermostat calls for heat, the heater wire gets hot to expand the steel strip 234. When the strip expands, the lever 226 moves counter-clockwise about point 232 under the influence of spring 244 tensioned between bracket 246 and lever 216. Thus, as the strip expands, the lever 216 moves to the right in a clockwise fashion about pivot 222 to allow the valves to move in the opening direction. Nut 248 on column 250 which supports the fulcrum point 252 for the semi-cylindrical member 240 can be adjusted to properly locate the lever 216 and the operating leaf spring 214 with respect to the valves when the steel strip is cold.

When the strip is cold it is desirable to have both valves seated as shown in Fig. 36. When the thermostat calls for heat the strip expands rapidly and the valves are lifted from their seats to establish full flow to the main burner. When the thermostat is satisfied, the strip will cool rapidly and shut both valves.

If it is desired to operate the burner between "high" and "low" rather than "high" and "off," the latch 254 can be depressed to engage notch 256 with the top of casing 258 and bring the lower end of the latch into position to prevent the leaf spring 214 from moving with lever 216 as shown in Fig. 37. This position is adjusted so that the large valve 208 is seated while the smaller valve 210 remains open. This will allow a low fire flow during the "off" periods of the thermostat. When it is desired to return the thermostat to conventional "on-off" operation, the latch 254 is released to take the lower end of the latch out of the path of leaf spring 214. It is merely necessary to push the latch 254 slightly to the left to disengage notch 256 whereupon spring 260 will return the latch to its inoperative position.

Referring now to Figs. 35 and 38, it will be seen that the series valve arrangement differs from the construction just described. In this case, the valves are designed so that the smaller valve 300 seats first to shut off the main flow from the plug outlet 40 with which it now directly communicates. This leaves only the pilot flow through chamber 302 past the larger valve 304 to the chamber 306 which communicates with the outlet chamber 44 in the main control. The porting arrangement employed here is illustrated in Fig. 38. Except for these differences, this embodiment works exactly the same as the embodiment just described. The purpose of showing this variation is to show another valving arrangement without departing from the spirit of the invention.

Figs. 39 through 41 illustrate still another embodiment. The first point of difference which will be noted with respect to this embodiment is that the safety valve 310 is of the thermocouple type; that is, it is biased towards its seat 312 by means of spring 314, but may be moved from its seat to seat the armature, not shown, on the thermocouple magnet within casing 316. The valve will be held in the open position providing the thermocouple 318 is heated by means of the pilot burner flame. The safety valve 310 is moved from its seat by depressing knob 320 in much the same manner as that described with respect to the previous embodiments to register the finger 322 with reset pin 324 to move the pin downwardly to act on arm 326 projecting from bracket 328 which is biased to the left (Fig. 40) by means of spring 330. Moving the arm 326 downwardly by means of the reset pin 324 acts to move the projecting finger 332 downwardly onto the face of the valve 310 to open the valve. This is best illustrated in Fig. 40.

It will be noted with respect to this embodiment, that no pressure regulator is provided in the main control, but that a simple cover plate 334 is provided in lieu of the pressure regulator assembly. It will be appreciated that this same modification can be made with respect to the other embodiments previously described if the pressure regulator is not desired. Similarly, the filter chamber 336 is not shown as being provided with a filter.

In this embodiment it will be noted that the series valves 338, 340 are arranged in the same manner as in the embodiment just described; that is, the smaller valve acts to shut off the main flow to the main burner, while the larger valve seats only when it is desired to shut off all flow to the main burner.

The manner of actuating the valves is slightly different in this embodiment than that with respect to the embodiment shown in Figs. 21 through 28. Thus, the various leaf springs have been eliminated by substituting therefor a compressed spring 342 acting to urge lever 344 towards the main operating lever or cam carrying lever 346. An adjustment screw 348 is provided to adjust the position of lever 344 to seat small valve 338 when the peak of cam 350 is at the roller 352. With this slight modification, the construction is simplified without sacrificing any of the operational features previously described with respect to the embodiment shown in Fig. 20.

The porting arrangement employed in this embodiment is shown in Fig. 41. It will be noted that the valve 338 is positioned to receive flow directly from the plug outlet 354 while the by-pass port 356 is also aligned with the plug outlet. The flow past both of the series valves 338, 340 goes into the chamber 358 in the intermediate casting which in turn communicates with the main outlet chamber 360 of the control.

This last embodiment illustrates the manner in which various structures can be modified without departing from the spirit of the invention. It will be noted that the casting for the main control is quite different from that employed with respect to the previously described embodiment. Similarly, the construction of the thermostatic unit differs in its details without departing from the spirit of the invention.

With all the various modified structures described herein, it will be readily appreciated that this invention is not to be limited to any particular modification, but is to be limited only by the scope of the claims.

We claim:

1. A gas flow control comprising, a valve body, a valve stem in said body, two valves carried by said stem in axially spaced relationship, two valve seats in the body positioned so each of said valves will seat on one of the seats, said stem being connected to one of said valves by lost motion means so that movement of the stem in the valve closing direction will act to seat said one valve first and continued movement of the stem in the closing direction will act to seat the other valve while the lost motion means takes up the motion difference between the one valve and the stem, both of said valves having a common outlet and a common inlet, a by-pass conduit connecting said inlet to the space between the valves so that closure of said one valve interrupts the major flow from the inlet to the outlet while a minor flow continues through said conduit, closure of both of said valves being effective to shut off all flow from the inlet to the outlet, thermostatic means operable to move said stem to open both valves, close both valves, or close only the one valve in response to temperature conditions at a remote location, said thermostatic means including means defining a variable volume chamber, a feeler bulb connected to said chamber by means of a capillary tube, a temperature responsive charge in said tube, bulb and chamber, a lever pivotally mounted in the body and operatively connected to said stem, means connecting said chamber to said lever to move the lever in the valve closing direction as the temperature at the bulb increases, means biasing the lever in the valve opening direction, a cam member, a cam follower member, one of the members being carried by said lever and the other member being mounted in said body, said cam member being formed to increase the resistance to valve closing movement of the lever abruptly at a position corresponding to seating of said one valve and to resist opening movement of the lever from the position in which both valves are seated, said cam and follower members thus requiring a build-up of force to pass the resistance points with the result that the lever snaps to the full closed position of the valves or to a position opening both valves.

2. A gas flow control comprising, a valve body, a valve stem in said body, two valves carried by said stem in axially spaced relationship, two valve seats in the body positioned so each of said valves will seat on one of the seats, said stem being connected to one of said valves by lost motion means so that movement of the stem in the valve closing direction will act to seat said one valve first and continued movement of the stem in the closing direction will act to seat the other valve while the lost motion means takes up the motion difference between the one valve and the stem, both of said valves having a common outlet and a common inlet, a by-pass conduit connecting said inlet to the space between the valves so that closure of said one valve interrupts the major flow from the inlet to the outlet while a minor flow continues through said conduit, closure of both of said valves being effective to shut off all flow from the inlet to the outlet, lever means operatively connected to said stem, and control means including temperature responsive means for actuating said lever to modulate the gas flow past said valves between full flow and the low flow occurring when said one valve seats and to snap the other valve shut, said control means being operative to snap the valves open from the fully closed position.

3. A gas flow control comprising, a valve body, a valve stem in said body, two valves carried by said stem in axially spaced relationship, two valve seats in the body positioned so each of said valves will seat on one of the seats, said stem being connected to one of said valves by lost motion means so that movement of the stem in the valve closing direction will act to seat said one valve first and continued movement of the stem in the closing direction will act to seat the other valve while the lost motion means takes up the motion difference between the one valve and the stem, both of said valves having a common outlet and a common inlet, a by-pass conduit connecting said inlet to the space between the valves so that closure of said one valve interrupts the major flow from the inlet to the outlet while a minor flow continues through said conduit, closure of both of said valves being effective to shut off all flow from the inlet to the outlet, temperature responsive means for operating said valves between full open and full closed positions, and means selectively operable to prevent closure of said other valve.

4. A gas flow control comprising, a valve body, a valve stem in said body, two valves carried by said stem in axially spaced relationship, two valve seats in the body positioned so each of said valves will seat on one of the seats, said stem being connected to one of said valves by lost motion means so that movement of the stem in the valve closing direction will act to seat said one valve first and continued movement of the stem in the closing direction will act to seat the other valve while the lost motion means takes up the motion difference between the one valve and the stem, both of said valves having a common outlet and a common inlet, a by-pass conduit connecting said inlet to the space between the valves so that closure of said one valve interrupts the major flow from the inlet to the outlet while a minor flow continues through said conduit, closure of both of said valves being effective to shut off all flow from the inlet to the outlet, a lever operatively connected to said valve stem, operator means connected to the lever and operative to move the lever when subjected to a temperature change, electric heater means positioned to heat said operator means and adapted to be energized when current flows therethrough, said operator means normally opening or closing both valves, and means for selectively limiting movement of said lever so the lever can only close said one valve.

5. A control according to claim 4 in which the operator means comprises a piece of material which expands or contracts as the temperature changes and has one end fixed while the other end of the piece is connected to the lever to transfer the expansion or contraction movement to the lever.

6. A control according to claim 5 in which said piece of material comprises a metallic strip, said heater means comprising a wire wound on said strip, and stand-off insulators on the edges of the strip to hold the wire from contacting the strip.

7. A valve assembly comprising, a valve body having an opening therein to receive a plug valve, a plug valve in the opening and having a stem projecting upwardly therefrom, a plate having an aperture through which the stem projects, said plate being mounted on the body, a knob having a sleeve engageable with the stem and projecting through said aperture in the plate, a radially projecting lug on said sleeve and normally underlying the plate, the underside of said plate having an arcuate cut-out in which the lug normally rides as the knob is turned and the ends of which act to limit rotary movement of the knob, means urging the knob away from the plug valve so the lug rides on the underside of the plate in the cut-out, means preventing downward movement of the knob and sleeve far enough to pass the lug under the plate portions at the end of the cut-out when the knob and plate are mounted on the body and permitting such movement when the plate and knob are removed from the body, a generally radial slot in said plate at a point not in communication with the cut-out and adapted to allow said lug to pass therethrough when assembling the knob to the body and being inaccessible to the lug when the plate and knob are mounted to the body, a collar projecting upwardly from the plate around the sleeve, another lug on the sleeve to normally lie above said collar to prevent downward movement of the knob and a generally axial slot in the collar to allow axial movement of the knob when said other lug registers therewith.

8. A valve assembly according to claim 7 in which the plug valve has "off," "pilot" and "on" positions and the underside of the plate in said cut-out portion is stepped at the "pilot" position to resist closing the valve to "off" position from the "on" position without moving the knob down at the "pilot" position sufficiently to clear the step, the step permitting unimpeded opening of the valve from "off" to "on," said collar being slotted to allow axial movement of the knob in the "pilot" position and when the first named lug on the sleeve is aligned with the slot in the plate.

9. A valve according to claim 7 in which the valve has "off," "pilot" and "on" positions, valve means requiring resetting, means carried by the know and engageable with the valve means when the knob is depressed in the "pilot" position, said collar being slotted to permit the knob to be depressed in the "pilot" position and when the first lug on said sleeve registers with the slot in said plate.

References Cited in the file of this patent

UNITED STATES PATENTS

| | | |
|---|---|---|
| 2,618,908 | Salter | Nov. 25, 1952 |
| 2,683,565 | Johnson | July 13, 1954 |
| 2,690,875 | Jenkins | Oct. 5, 1954 |